United States Patent
Wilson et al.

(10) Patent No.: US 9,491,098 B1
(45) Date of Patent: Nov. 8, 2016

(54) TRANSPARENT NETWORK MULTIPATH UTILIZATION THROUGH ENCAPSULATION

(71) Applicant: Amazon Technologies, Inc., Reno, NV (US)

(72) Inventors: Matthew Shawn Wilson, Seattle, WA (US); Andrew Bruce Dickinson, Seattle, WA (US); Justin Oliver Pietsch, Bothell, WA (US); Aaron C. Thompson, Seattle, WA (US); Frederick David Sinn, Seattle, WA (US); Alan Michael Judge, Dublin (IE); Jagwinder Singh Brar, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 175 days.

(21) Appl. No.: 14/083,005

(22) Filed: Nov. 18, 2013

(51) Int. Cl.
*H04L 12/741* (2013.01)
*H04L 12/803* (2013.01)

(52) U.S. Cl.
CPC ............. *H04L 45/74* (2013.01); *H04L 47/125* (2013.01)

(58) Field of Classification Search
CPC ..... H04L 45/74; H04L 47/125; H04L 47/10; H04L 47/12; H04L 47/122; H04L 47/18; H04L 12/4633
See application file for complete search history.

(56) References Cited

U.S. PATENT DOCUMENTS

| 6,993,021 | B1 | 1/2006 | Chuah et al. |
| 7,865,586 | B2 | 1/2011 | Cohn |
| 7,911,953 | B1 * | 3/2011 | Prestor et al. ................. 370/235 |
| 8,244,909 | B1 | 8/2012 | Hanson et al. |
| 8,331,371 | B2 | 12/2012 | Judge et al. |
| 8,478,896 | B2 | 7/2013 | Ehlers |
| 9,204,315 | B2 * | 12/2015 | Sridhar .................. H04W 24/02 |
| 2008/0205272 | A1 * | 8/2008 | Vasseur et al. ............... 370/235 |
| 2009/0279431 | A1 * | 11/2009 | Baruah et al. ................. 370/235 |
| 2012/0063314 | A1 * | 3/2012 | Pignataro et al. ............. 370/235 |
| 2012/0163388 | A1 * | 6/2012 | Goel .................... H04L 12/4641 370/395.53 |

OTHER PUBLICATIONS

U.S. Appl. No. 14/526,410, filed Oct. 28, 2014, Eric Jason Brandwine.
U.S. Appl. No. 12/825,212, filed Jun. 28, 2010, Alan M. Judge et al.
U.S. Appl. No. 13/252,712, filed Oct. 4, 2011, Richard H. Galliher III, et al.
Costin Raiciu, et al "Improving Datacenter Performance and Robustness with Multipath TCP" SIGCOMM'11, Aug. 15-19, 2011, pp. 1-12.
Albert Greenberg, et al "VL2: A Scalable and Flexible Data Center Network" Communications of the ACM, vol. 54, No. 3, Mar. 2011, pp. 1-10.
Chuanxiong Guo, et al "BCube: A High Performance, Server-centric Network Architecture for Modular Data Centers" SIGCOMM'09 Aug. 17-21, pp. 1-12.
U.S. Appl. No. 13/073,182, filed Mar. 28, 2011, Daniel T. Cohn, et al.

* cited by examiner

*Primary Examiner* — Benjamin H Elliott, IV
(74) *Attorney, Agent, or Firm* — Robert C. Kowert; Meyertons, Hood, Kivlin, Kowert & Goetzel, P.C.

(57) ABSTRACT

Methods and apparatus for transparent multipath utilization through encapsulation are disclosed. Respective encapsulation packets are generated for at least two different baseline packets transmitted between a source and destination linked by multiple network paths. Each encapsulation packet comprises contents of a corresponding baseline packet, and one or more data values selected in accordance with a path balancing policy. The data values added to one encapsulation packet may differ from those added to another. Different network paths to the destination may be selected for different encapsulation packets of a given transmission based at least in part on the added data values.

20 Claims, 9 Drawing Sheets

TRANSPARENT NETWORK MULTIPATH UTILIZATION THROUGH ENCAPSULATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Operators of networks that enable clients to use hundreds or thousands of virtualized resources within a given data center, or spread over multiple data centers, often set up interconnect topologies that offer multiple parallel physical network paths between a given pair of virtualized resources. However, many conventional approaches to networking may end up underutilizing the bandwidth available for any given high-volume data transfer, e.g., by using only a small subset of the parallel paths available. As a result of the lack of balance in the network traffic, application performance may suffer in at least some cases, and the return on the operator's investment in the high-bandwidth interconnect infrastructure may be less than satisfactory.

Figure 1:
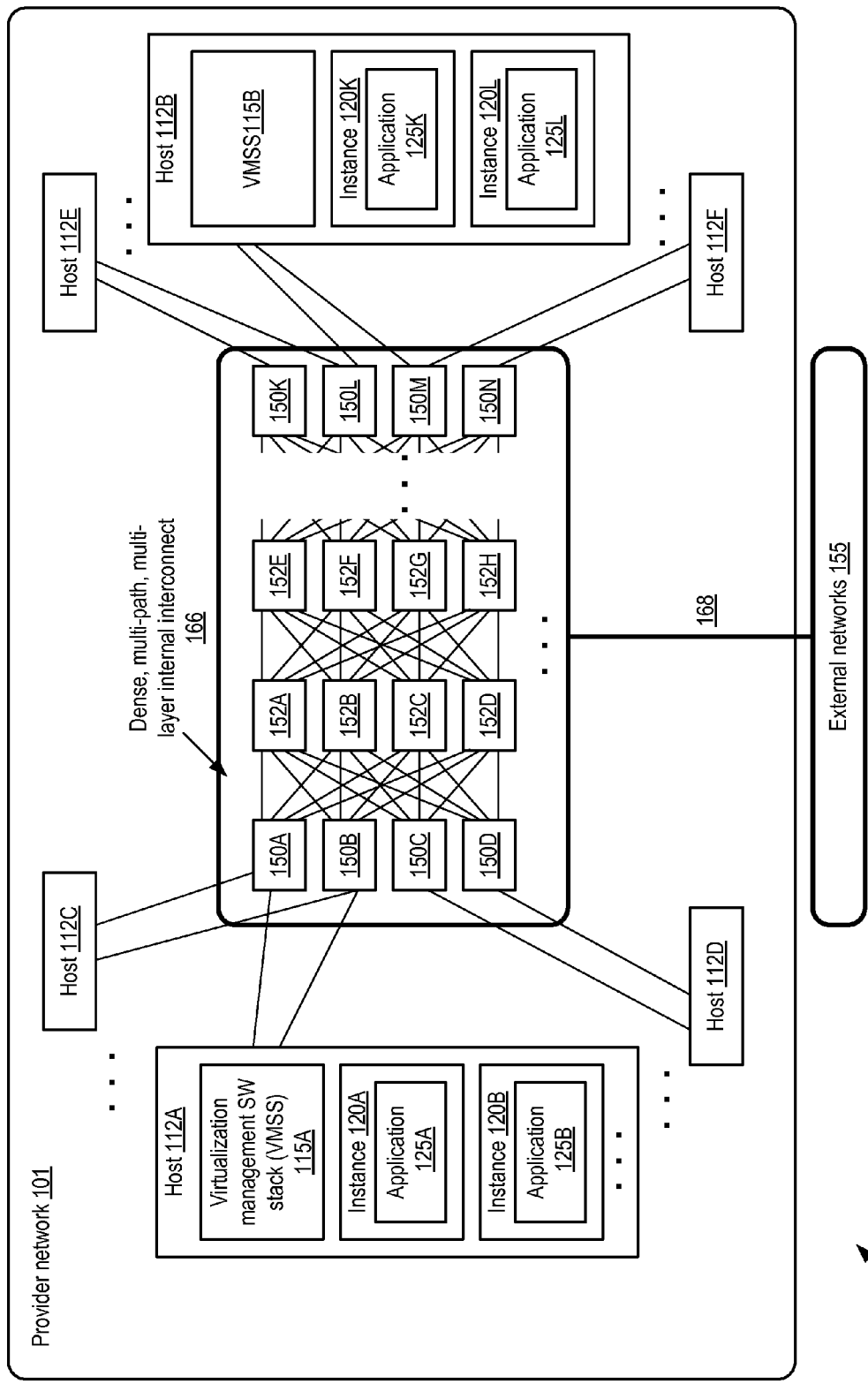
FIG. 1 illustrates an example of a system in which virtualization hosts of a provider network are linked by a dense, multi-layer, multi-path interconnect, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for transparent network multipath utilization via encapsulation are described. The encapsulation techniques described may help increase, for a given network transmission between two endpoints within a provider network, the utilization levels of multiple physical network paths available, and thereby help to improve the overall performance of applications being implemented using the provider network's resources. The term "network transmission", as used herein, refers generally to a transfer of some amount of data between two endpoints (such as a pair of applications, or a pair of modules of the same application, typically running on different hosts) in accordance with one or more networking protocols. As described below, in some embodiments, although the encapsulation technique may involve the participation of modules of virtualization management software stacks at the sending and receiving hosts, changes to operating systems at which the sending and receiving application components execute may not be required, and modifications to conventional routing logic may also not be required. Thus, the encapsulation-based traffic distribution may be considered transparent with respect to the routing logic and also with respect to operating systems hosting the applications on whose behalf the data is being transmitted. It is noted that although, for ease of explanation, much of the following description refers to a "source" and a "destination" for a given network transmission, the encapsulation techniques may also be applied in various embodiments for traffic flowing in either direction for a bi-directional transmission, so that the two endpoints involved in the transmission may each be considered either a "source" or a "destination" for different subsets of the bi-directional traffic.

Networks set up by an entity such as a company or a public sector organization to provide one or more network-accessible services (such as various types of cloud-based computing, storage or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network.

A virtualized computing service may be implemented in at least some embodiments, enabling a variety of client applications to run at virtual compute servers or "compute instances" instantiated on behalf of the clients. The compute instances may each comprise a virtual machine, with its own operating system comprising a networking software stack, and multiple such instances may be hosted on a given physical server or "virtualization host" at a provider network data center. Each virtualization host may include a respective virtualization management software stack (VMSS), including for example a hypervisor and/or an instance of an operating system dedicated to administering the compute instances running on the host. Each VMSS may include its own networking software stack, responsible for communication with other VMSSs and, at least in some embodiments, also responsible for implementing network connectivity between the instances running on the virtualization host and other instances running on other virtualization hosts.

Many applications executed on behalf of provider network clients may involve transmissions of large amounts of data between source and destination application components running on respective compute instances, often at different virtualization hosts. For example, a content management application or an online video application may need to transfer gigabytes of data between a source compute instance CI1 running on a virtualization host VH1, and a destination compute instance CI2 running on a different virtualization host VH2. A given virtualization host VH1 may be configurable to accommodate multiple compute instances, several of which may be used for network-intensive applications simultaneously. In order to be able to handle large amounts of network traffic between instances at different virtualization hosts, in at least some embodiments dense multi-path, multi-layer interconnect topologies (such as "fat trees", VL2 (Virtual Layer 2) topologies, BCube topologies, or other topologies based on Clos networks) may be set up by provider network operators. Such interconnect topologies may support, for example, multiple tens of gigabits per second of peak available bandwidth between at least some pairs of virtualization hosts.

However, the mere existence of such dense topologies may not always result in optimal distribution of network traffic across the multiple paths available between sources and destinations, and in practice underutilization of the available bandwidth may often be observed. Some conventional routing techniques (such as various forms of ECMP or equal-cost multi-path routing) may rely, for example, on selecting the next hop for a given packet based on some set of header field values of the packet, such as the 5-tuple value of {source IP address, destination IP address, source port, destination port, protocol ID of the networking protocol in use}. The values in the header fields may be used as input for a hash function, for example, and the output of the hash function may be used to select the next hop or link for the packet. For different TCP/IP (Transmission Control Protocol/Internet Protocol) connections, schemes that rely on selecting hops based on functions of header field values may succeed in distributing traffic across multiple paths, because some of the header field values would typically differ (e.g., a different IP address or port may be used for connection C1 than for connection C2). However, for a given TCP/IP connection, the 5-tuple header field values may be identical for all packets, and consequently, a routing technique that uses hashing or some similar technique on such header field values may always select the same hop for different packets of the connection. Often, some connections involve much greater amounts of data transfer than others; that is, data transfer amounts may not be uniformly distributed among different connections. As a result, some links of the dense interconnect may end up being much more heavily utilized than others.

In order to improve the overall utilization of dense multi-path interconnects, in some embodiments an encapsulating mechanism may be implemented. Such a mechanism may involve the instantiation of an encapsulating intermediary, e.g., at the VMSSs of the sending (and receiving) virtualization hosts. The encapsulating intermediary may receive or intercept packets generated by the networking stacks at the virtual machines at which the sending application component runs. Such received/intercepted packets may be termed "baseline" packets herein. The encapsulating intermediary may add specially constructed header field values to the baseline packets to form corresponding encapsulation packets. An encapsulation packet may thus be considered an "outer" packet or a "containing" packet for the corresponding baseline packet, and a baseline packet may be considered an "inner" or "contained" packet of the corresponding encapsulation packet. The added header field values may be determined in accordance with a path-balancing policy, e.g., in such a way that the routing components of the interconnect end up distributing different encapsulation packets of the same transmission among several different physical paths. For example, in one embodiment, an encapsulating intermediary may add an IP header (e.g., with the IP address for the correct destination virtualization host) as well as one or more randomly selected UDP (User Datagram Protocol) header field values to a baseline TCP/IP packet to form an encapsulation packet. The added UDP header field values may include, for example, a randomly selected source port number and/or a randomly-selected destination port number. When a routing component such as a node of the interconnect receives such an encapsulation packet, in at least some implementations, the routing component may analyze the contents of the UDP and IP headers in order to select the next hop along which the encapsulation packet is to be used. (The routing component may analyze the outermost headers of the encapsulation packet, for example, and may regard the contained baseline TCP packet as the body of the packet.) As the UDP header field values were randomly selected, different encapsulation packets for the same applications' TCP/IP connection may end up being directed along different paths, thereby distributing the data traffic for a single connection among multiple paths. It is noted that techniques other than random selection may be used for selecting the values of the added header fields in at least some embodiments, e.g., an algorithm that increments the UDP sender port value for every packet of a given transmission may be used in some embodiments, or a technique that determines the UDP header packet based on other factors such as contents of the TCP baseline packets may be used. The distribution of the traffic among different physical paths may be accomplished using any of various techniques that generally assign different values to the added header fields for respective baseline packets in various embodiments.

At the receiving virtualization host, e.g., at the virtualization host at which the destination application component of the TCP/IP connection executes within one of the compute instances, in some embodiments an unpacking component of the VMSS may be responsible for stripping the added header field values from the encapsulation packet to extract the baseline TCP/IP packet, and for passing on the baseline packet to the networking stack of the destination compute instance. In several embodiments, a single component of the VMSS may be responsible for the encapsulating and unpacking functionality—e.g., such an encapsulation/unpacking intermediary at a given VMSS may be responsible for adding header field values to outgoing packets, and extracting baseline packets from incoming packets. In the remainder of this document, the term "encapsulating intermediary" may be used to refer to a component that performs both the encapsulation and unpacking functions, depending on the direction of the traffic flow.

In at least some embodiments, in addition to ensuring that multiple paths are used for different packets of a given transmission, and that the packets are routed to the correct destination virtualization host, the encapsulating intermediary may be configurable to perform additional functions. For example, in at least one embodiment in which encapsulation involves using headers of a protocol such as UDP that does not guarantee in-order delivery of packets, the encapsulating intermediary may also generate a sequence number to be added to a baseline packet to form an encapsulation packet. At the receiving end, when the encapsulation packets are unpacked, the unpacking intermediary may make a best-effort attempt to use the sequence numbers to deliver the corresponding baseline packets in order to the receiving compute instance's networking stack. Thus, in some embodiments, from the application perspective, a TCP/IP connection that guarantees in-order delivery may be set up between the source compute instance and the destination compute instance at respective virtualization hosts. Under the covers, in such embodiments, the encapsulating/unpacking mechanism may make it appear to the routing components of the interconnect as though a set of UDP packets (e.g., with different UDP port numbers for different packets) is being transmitted, rather than a set of TCP packets. At the receiving host, the unpacking intermediary may in some implementations store the encapsulation packets temporarily in a buffer to help with in-order delivery. The unpacking intermediary may, in some embodiments, use the sequence numbers added by the sending encapsulation intermediary to attempt to deliver the baseline TCP/IP packets to the destination compute instance in the correct sequence (i.e., in the same sequence in which the TCP/IP packets were sent by the source compute instance). In some implementations, depending on the size of the buffer and/or on real-time traffic conditions, the unpacking intermediary may not be able to deliver all the extracted baseline packets in order. In such a scenario, the networking stack of the destination compute instance may request retransmissions of the missing packets using the standard procedures used for the networking protocol in use between the source and destination instance network stacks (e.g., either by an explicit retransmission request or implicitly, by not sending acknowledgements for the missing packets, which would lead the sending networking stack to retransmit the undelivered packets). In some embodiments, the sequence number added by the encapsulating intermediary may be determined based at least in part on a sequence number already incorporated within the baseline packet (e.g., if the baseline packet is a TCP packet, the TCP packet's sequence number, originally set at the networking stack of the source compute instance, may be used to derive the sequence number added by the encapsulating intermediary).

In some embodiments, the operating systems in use at the source and destination compute instances may support large ("jumbo") packet sizes or frame sizes. In such embodiments, the encapsulation intermediary may be configured to break up a given jumbo baseline packet generated by the source compute instances into smaller pieces, such that several different encapsulation packets are transmitted corresponding to a single jumbo baseline packet. Similarly, at the receiving side, the unpacking intermediary may be configured in some such embodiments to combine the pieces of a given baseline jumbo packet before passing on the packet to the networking stack at the destination instance. In some embodiments, the encapsulation intermediary may combine multiple different baseline packets generated by one or more source compute instances on the same host and destined for one or more compute instances on the same destination host into a single encapsulation packet, such that several different baseline packets are transmitted in a single encapsulation packet. At the receiving side, the unpacking intermediary may be configured in some such embodiments to unpack the multiple baseline packets and pass them to the respective networking stack(s) for the destination instance(s).

In at least some embodiments, path-balancing using encapsulation may not be implemented for all the network transmissions from or to a given application component, for all the network transmissions from or to a given compute instance, or for all the packets transmitted between a given pair of hosts. Instead, the encapsulation intermediary may determine, based on any of several factors, whether path-balancing is to be used for a given set of packets, e.g., for a given TCP/IP connection or for packets belonging to several different TCP/IP connections. Such factors may include, for example, an expected amount of data to be transferred, the identity of the sending or receiving client (e.g., path balancing may be applied to data transfers of some clients, but not others, based on the expected volumes of data transfers of the clients or based on contractual relationships established with the clients), the nature of the application involved in the transfer, an estimate of the number of alternative paths available between the source and destination, or an estimate of the number of hops or links involved in the data transfer. In some implementations, path balancing may be implemented at client request, e.g., a client may submit a balancing request indicating that the maximum amount of parallelism possible be used for the client's data transfers. In at least some implementations, the decision as to whether to use path balancing or not may be made based at least in part on client budget limits—e.g., clients may be charged more for path-balanced data transfers, and a given client interested in optimized data transfers may be able to designate a budget to be used for path-balanced transfers. In such a scenario, the encapsulation mechanism may stop using path-balancing techniques for the client if the designated budget is exhausted. A path-balancing policy may include the factors to be considered in deciding whether path balancing is to be attempted in some embodiments, as well as the logic to be used to determine values of fields to be added to baseline packets in the cases where path balancing is used. In some embodiments, several different path-balancing policies may be implemented, e.g., different policies may be applied for different client categories, different application categories, or different data centers of the provider network. It is noted that at least in some embodiments, even if a decision to attempt path balancing is made for a transmission, it may not be the case that the traffic of that transmission is necessarily uniformly distributed across all the available paths. Such a scenario may result due to any of several factors: for example, because routing components may estimate different costs for some of the alternative paths and select some paths in preference to others based on cost, or because the header field values added by the encapsulation mechanism don't happen to lead to a uniform distribution.

It is noted that an encapsulation intermediary may be used for purposes not directly related to path balancing in at least some embodiments. In some such embodiments, for example, in which virtualized networking is supported, arbitrary client-selected network addresses, which may be unrelated to the IP addresses associated with the host's VMSS, may be assigned to various compute instances at a given virtualization host. In order to direct client traffic to the appropriate destination instances, in such embodiments, the VMSSs at the virtualization hosts may be configured to add some set of network headers (e.g., IP headers with the IP addresses of the destination virtualization hosts) to the baseline packets regardless of whether path balancing techniques similar to those described above are being used. In addition, additional encapsulation fields may be added to the baseline packets, e.g., fields that identify the client(s) on whose behalf data is being transmitted, which may be used for billing purposes or monitoring purposes, for example.

As described above, in some embodiments, the encapsulation intermediary module(s) on the sending side of a transmission may be implemented at the same host (e.g., within a VMSS at the same host) as the application component whose data is being transmitted. In other embodiments, however, an encapsulation intermediary component may be implemented at a different device than the host at which the source application runs, e.g., at one or more nodes of the interconnect. Similarly, in some embodiments, the unpacking intermediary may be implemented at a different device (such as an interconnect device) than the host at which the receiving application runs. In at least some embodiments, the source and/or destination applications may be run on a non-virtualized compute server, e.g., on a physical server that does not have a VMSS installed. In some embodiments, encapsulation fields (e.g., the fields added to the baseline packets for the purpose of path balancing) may not necessarily correspond to headers for networking protocols of the Internet protocol suite. For example, if the routing components of the interconnect are capable of parsing other types of fields than TCP, UDP, or IP header fields, and using such other fields for routing decisions, values may be generated for such other types of fields by the encapsulating intermediary. In some implementations, other networking protocols (e.g., protocols other than TCP, UDP or IP) may be used for path balancing and/or more generally for transmissions between source and destination application components of the provider network. In some embodiments, path balancing techniques similar to those described above may be employed even if either the source application component, or the destination application component, is being implemented outside the provider network, e.g., in a client data center at which equivalents of the encapsulation intermediaries have been installed at one or more devices.

Example System Environment

FIG. 1 illustrates an example of a system 100 in which virtualization hosts of a provider network are linked by a dense, multi-layer, multi-path interconnect, according to at least some embodiments. As shown, system 100 comprises a provider network 101 that includes a plurality of hosts 112 used for implementing virtual compute instances 120, such as hosts 112A, 112B, 112C, 112D, 112E and 112F.

As shown, at least some subset of the hosts 112 may be linked via a dense, multi-path, multi-layer internal interconnect 166 that includes a plurality of different physical paths between pairs of virtualization hosts. In the depicted embodiment, the dense interconnect 166 is shown as comprising a number of distinct layers, including outer layers (i.e., layers directly connected to hosts 112) comprising interconnect nodes 150 (e.g., nodes 150A, 150B, 150C, 150D, 150E, 150F, 150G, and 150H), and inner layers (not directly connected to hosts 112) comprising a different class of interconnect nodes 152 (e.g., nodes 152A, 152B, 152C, 152D, 152E, 152F, 152G and 152H). In the depicted embodiment, the outer layer nodes 150 may differ from the inner layer nodes 152 in various characteristics, such as the physical arrangement of the nodes (e.g., outer layer nodes 150 may be arranged in racks physically close to the racks at which hosts 112 are housed), the number of nodes per rack, the number of distinct "in" and/or "out" ports at each node, the performance capabilities (e.g., bandwidth and/or latency) of the physical links leading into and/or out of the nodes, and so on. In some embodiments, the outer layer nodes may be referred to as "bricks", and the inner layers may be referred to collectively as a "fabric". In other embodiments, nodes used for various interconnect layers may have similar capabilities, e.g., each of the nodes of the interconnect may be identical. Various different types of topologies may be used for the dense interconnect in different embodiments, such as "fat trees", VL2 topologies, BCubes, high radix network fabric topologies, or various other types of topologies based on Clos networks. The interconnect nodes 150 and/or 152 may comprise, for example, switches (e.g., intelligent switches equipped with routing functionality), routers, and/or various other types of networking devices in different embodiments. In at least some embodiments, the interconnect nodes may comprise inexpensive commodity hardware and/or software components.

In the depicted embodiment, at least a subset of the hosts 112 may comprise a respective virtualization management software stack (VMSS) 115, such as VMSS 115A at host 112A and VMSS 115B and host 112B. The VMSS 115 at a given host 112 may include, for example, a hypervisor and/or a special instance of an operating system that is designated for administrative uses (as opposed to operating system instances at virtual machines being used for client applications). Hosts with VMSSs may also be referred to as virtualization hosts. Each host with a VMSS 115 may be capable of instantiating one or more virtual machines or compute instances, such as instances 120A and 120B at host 112A, and instances 120K and 120L at host 112B. Each such instance 120 may include a respective instance of an operating system, including a networking stack for one or more network protocols such as TCP, UDP and IP protocols of the Internet suite. Each instance 120 may be allocated to a respective client, e.g., for use for one or more applications or application components, such as application 125A at instance 120A, application 125B at instance 120B, application 125K at instance 120K, and application 125L at instance 120L.

Network traffic between the applications 125 running at different instances 120 may take the following general path in the depicted embodiment. The source application's data may be organized into baseline packets at the source instance's networking stack, with each baseline packet including a body (the application data, or a portion thereof) and a set of headers (depending on the specific networking protocols being used for the transmission). Any appropriate network protocol may be used for a given network transmission, which may comprise a sequence of packets sent from a source application or application component to a destination application or application component. For example, a connection-oriented protocol such as TCP may be used for a network transfer between application components, or a connectionless protocol such as UDP may be used. The baseline packets may be passed, e.g., via virtual network interfaces, to the VMSS 115 at the source host.

In some embodiments, the VMSS may comprise one or more subcomponents responsible for determining, e.g., based on criteria of a path-balancing policy in use, whether a path balancing technique is to be employed for a given network transmission between a source and destination instance. At least for those network transmissions for which path balancing is to be implemented, an encapsulation intermediary component at the VMSS 115 may add one or more data fields, such as UDP and/or IP header fields to a baseline packet to generate an encapsulation packet. In the case of a network transfer for which a TCP connection was established between the source and destination, for example, and one or more UDP headers were added during encapsulation, the encapsulation packet may appear to be a UDP packet whose body contents happen to include a complete TCP packet (with its own headers). In the case of a network transfer for which UDP was used at the source instance 120, in at least some implementations a new set of UDP headers may be added for encapsulation, so that the encapsulation packet may include two sets of UDP headers—one set added by the encapsulating layer, and one set generated at the source instance. The encapsulating intermediary may select values for the added header fields in accordance with the path balancing policy in the depicted embodiment, e.g., such that routing components involved in selecting hops or links for the encapsulation packets select different hops for different encapsulation packets corresponding to a single transmission. For example, in one embodiment, if the network transmission is between source application 125A of instance 120A at host 112A and destination application 125K at instance 120K of host 112B, randomly-selected UDP source port numbers may be added as encapsulated field values by VMSS 115A, so that nodes 150 and/or 152 of the interconnect 166 transmit successive encapsulation packets of the transmission along different combinations of physical links (e.g., along paths selected based on a hash value obtained at least in part from the added random header values). The local routing decisions within various interconnect layers may thus be based on the added-on field values, without necessarily having to change routing logic of the interconnect components. At the same time, an IP header also added by the encapsulating intermediary may have the correct IP address of the destination host's VMSS, so that the encapsulation packets ultimately (at least in the absence of packet loss) reach the correct destination host.

Once an encapsulation packet reaches the destination host VMSS, such as VMSS 115B at host 112B, an unpacking intermediary may extract the baseline packet from the encapsulation packet (e.g., by stripping the added fields) and pass on the baseline packet to the networking stack at the instance (e.g., 120K) at which the destination application 125K runs. It is noted that although, for ease of explanation, unidirectional network traffic has been discussed herein, similar techniques may be used in either direction for bi-directional traffic in at least some embodiments, with the roles of the source and destination elements reversed for different subsets of the bi-directional traffic. In some embodiments in which the source and destination applications rely on in-order delivery of the baseline packets (as in the case of TCP connections), while the encapsulation headers correspond to a protocol such as UDP that does not guarantee in-order delivery, sequence numbers may be added as part of the encapsulation procedure. In such embodiments, the unpacking intermediary at the destination VMSS may in some cases receive an encapsulation packet out of order. The destination VMSS may therefore buffer one or more encapsulation packets in some implementations, at least for a predetermined time period, in an attempt to provide the extracted baseline packets to the destination instance in the expected order. If the missing encapsulation packets are not received in the time period, one or more baseline packets may nevertheless be delivered out of order to the destination instance 120 in some such implementations, and the networking stack at the destination instance may take the appropriate steps in response to the out-of-order delivery (e.g., by not sending acknowledgements for the missing packets, or by requesting retransmissions of the missing packets, per the network protocol being used). It is noted that from the perspective of source and destination applications 125A and 125K, source and destination instances 120A and 120K, and the interconnect nodes 150 and 152, no changes may be required for path balancing to be implemented in the depicted embodiment.

In the embodiment shown in FIG. 1, network transfers within the provider network 101, i.e., between different virtualization hosts 112, may be completed using the dense interconnect 166. Network transmissions to/from other destinations outside the provider network may involve the use of external networks 155, e.g., via additional links 168 between the internal interconnect 166 and the external networks. In some embodiments, the use of encapsulation-based path balancing techniques may be limited to transfers for which both the source and destination are within the provider network. In some embodiments, a destination within the provider network may not be a final destination. For example, a destination may be an edge device of interconnect 166 for sending network traffic out to an external network 155. In such an embodiment, the encapsulation-based path balancing techniques as described herein may be employed between a source and such an edge device within the provider network 101, but the added encapsulation may be removed once the traffic is sent to the external network 155. Dense multi-path interconnects may be in use at several different data centers of a provider network in some embodiments, and path balancing to try to increase bandwidth utilization of the interconnects may be employed even if the source and destination are at different data centers (i.e., even if some of the links involved in the transmission do not form part of a dense interconnect). In at least some embodiments, encapsulation-based path balancing may be employed even if either the source, the destination, or both the source and destination are outside the provider network. For example, in some embodiments, an encapsulating/unpacking module may be provided for installation at devices within client networks, so that path balancing of the kind described above is enabled even if a source or destination lies within a client network rather than the provider network. It is noted that although the VMSSs 115 of FIG. 1 include the encapsulating intermediary, similar encapsulation and unpacking functionality may be implemented using software and/or hardware other than VMSS components in at least some embodiments. Each host 112 is shown with two links to the outer layer nodes 150 of interconnect 166 in the embodiment depicted in FIG. 1, although a different number of links may be used in other embodiments. In at least some such implementations in which multiple links are available between hosts and a dense interconnect, the encapsulating intermediaries may balance traffic corresponding to a given network transmission among the host-to-interconnect links as well, e.g., using random or round-robin selection. In at least some embodiments, path-balancing may not necessarily be attempted for all the packets of a given network transmission. For example, traffic may flow over a long-lasting TCP connection for days or weeks, and network conditions may change in such a way during that period that it may not always be advisable to attempt path balancing for all packets. In such a scenario, path balancing may be switched on and off as needed during the lifetime of the network transmission, depending for example on criteria specified in the path-balancing policy in use.

Examples of Alternate Network Paths in a Dense Interconnect

Figure 2:
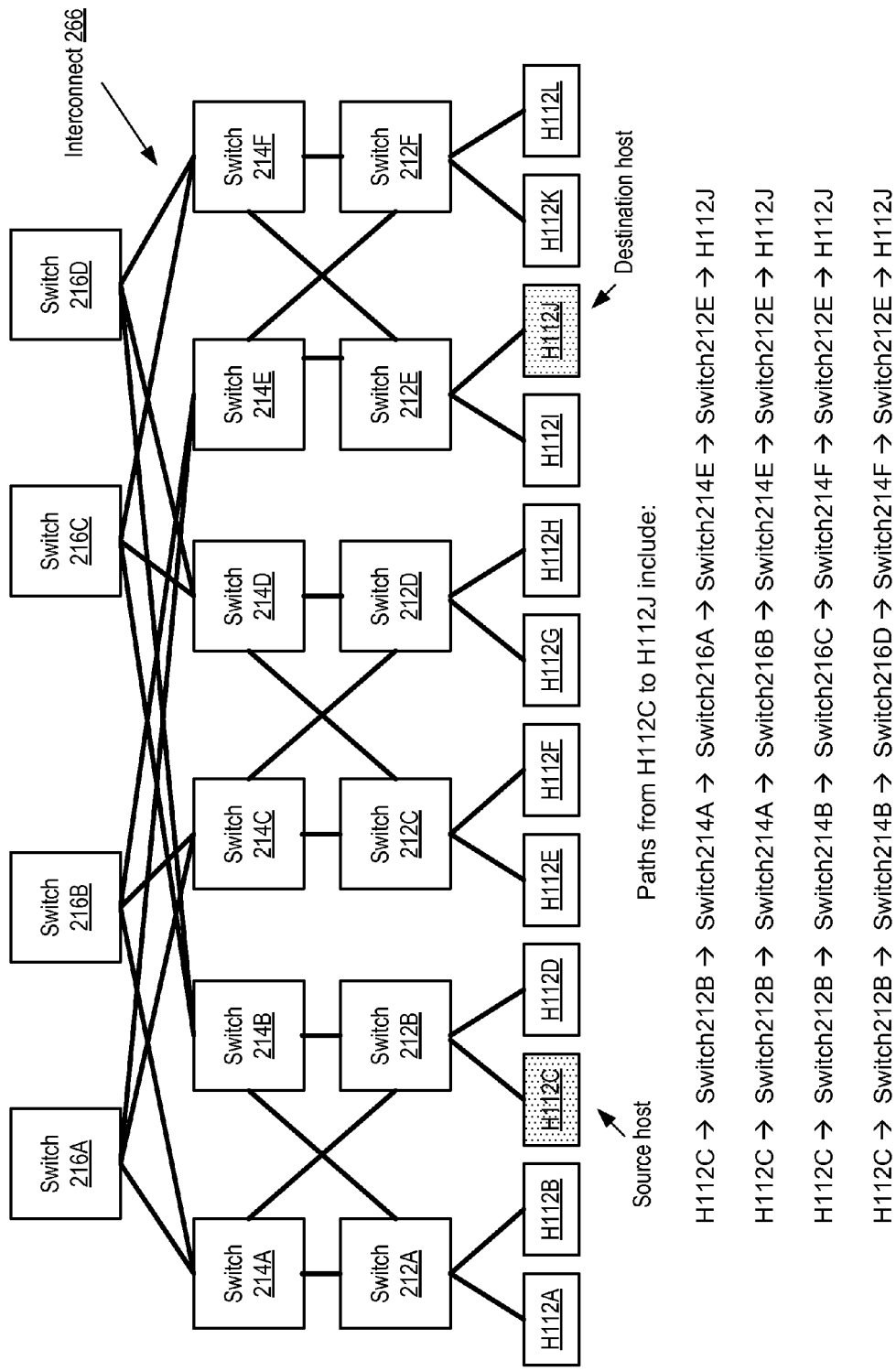
FIG. 2 illustrates examples of alternate network paths available between a pair of virtualization hosts connected by a fat-tree interconnect, according to at least some embodiments.

As described earlier, a number of different types of dense, multi-path interconnect topologies may be used in different embodiments, including fat trees, VL2 topologies, BCube topologies, and the like. By way of example, FIG. 2 illustrates alternate network paths available between a pair of hosts (H112C and H112J) connected by a fat-tree interconnect 266, according to at least some embodiments. In the depicted embodiment, hosts H112A-H112L are each linked to a first layer or "Tier-1" of switches 212A-212F. Switches 212 of the first layer are each linked to two hosts H112 and to two second-layer ("Tier-2") switches 214, such as switches 214A-214F. Each second layer switch 214 is in turn linked to two third-layer ("Tier-3") switches 216, e.g., 216A-216D. Each third-layer switch 216 may be linked to four different second-layer switches 214. It is noted that, for clarity, FIG. 2 shows a much-simplified example, and that in many practical large-scale implementations the link fan-out between different switch layers and/or between the switches and the hosts may be much higher than that shown in FIG. 2; the number of layers or tiers may also be higher. Each of the links shown in FIG. 2 may support bandwidths of several gigabits/second (e.g., 10 Gbit/second) in at least some implementations.

Several different physical network paths are available for traffic between source host H112C and destination host H112J in the depicted embodiment. For example, as shown, four such paths that differ from each other in at least one link may include (a) switches 212B, 214A, 216A, 214E, 212E; (b) switches 212B, 214A, 216B, 214E, 212E; (c) switches 212B, 214B, 216C, 214F, 212E; and (d) switches 212B, 214B, 216D, 214F 212E. As the number of layers and/or the link fan-out increases, many more alternative paths may be possible between a given pair of hosts connected via such dense interconnects. In at least some embodiments, at least some of the interconnect nodes such as Tier-1, Tier-2 or Tier-3 switches 212, 214 or 216 may be configured to select the next link to be used to for a given packet based on the contents of packet headers that they can parse, and/or based on estimates of the costs of using each of available links. In at least some dense interconnects, the routing-related costs of different links between the interconnect nodes may typically be determined to be equivalent. If all the links available are deemed to be of equivalent cost, link selection may be based primarily on packet header contents. Different types of packet headers may be used for link selection in different embodiments, include, for example, headers comprising source and destination port numbers, source and destination IP addresses, protocol identifiers, or other types of header fields. By inserting different header field values for different encapsulation packets of the same transmission (e.g., different packets for the same TCP connection), the traffic may be distributed fairly uniformly among the alternative paths in at least some implementations. Of course, the extent of the overall uniformity achieved, and the overall improvement in average interconnect link utilization levels, may vary in different embodiments, depending on the approaches used for determining the header field values (e.g., the extent to which the added header field values are themselves uniformly distributed), relative timings and sizes of different transmissions, and/or other factors.

Components of Encapsulation/Unpacking Intermediaries

Figure 3:
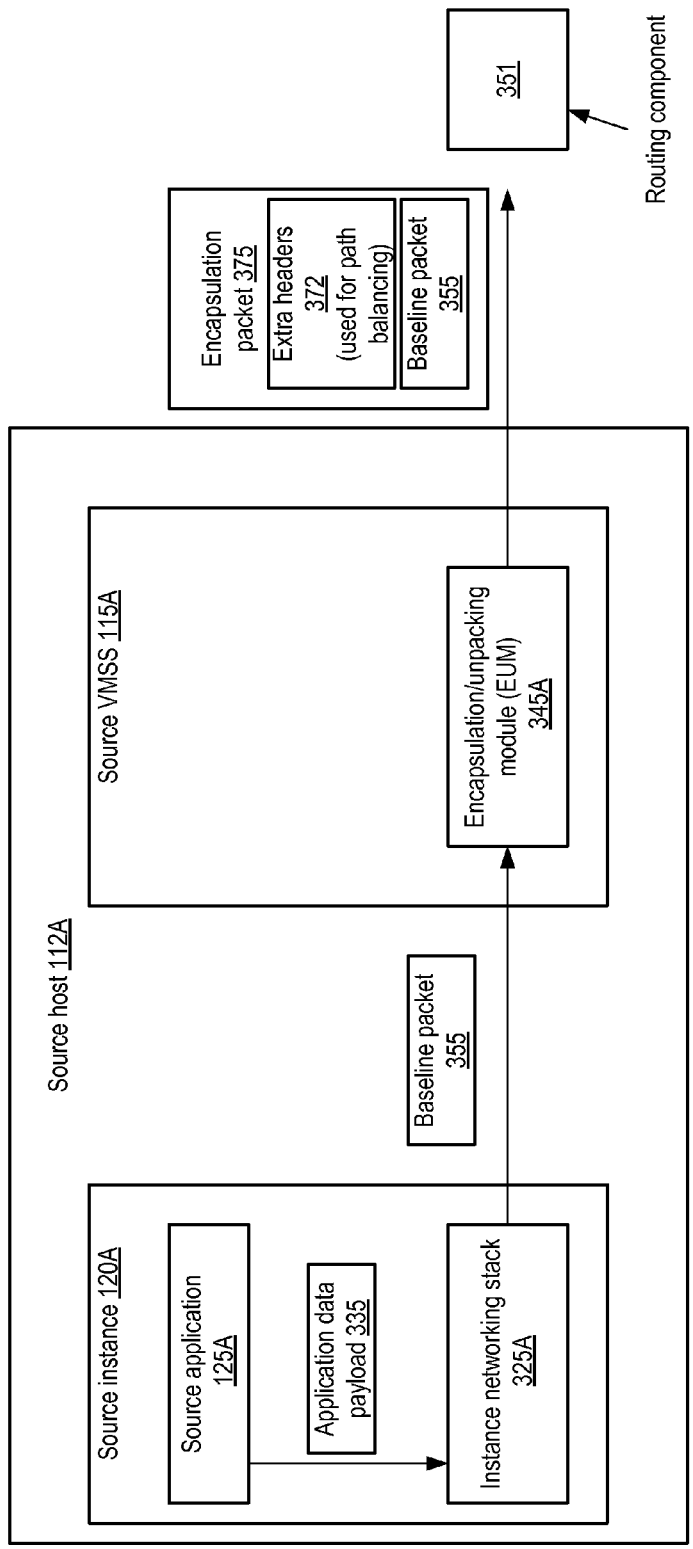
FIG. 3 illustrates an example of components that may participate in an encapsulation technique at a network transmission source in an attempt to distribute network traffic across multiple physical paths, according to at least some embodiments.

FIG. 3 illustrates an example of components that may participate in an encapsulation technique at a network transmission source in an attempt to distribute network traffic across multiple physical paths, according to at least some embodiments. As shown, source host 112A may comprise a source instance 120A and a virtualization management software stack (VMSS) 115A. A client's application source application 125A may be executed at the instance 120A. The VMSS 115A may include an encapsulation/unpacking intermediary module 345A in the depicted embodiment.

In some embodiments, a connection-oriented protocol such as TCP may be used between the source and destination application level components involved (which may also be referred to as the "server" and "client" ends of the connection). In such a scenario, a TCP connection may first have to be established with the destination instance, e.g., using one or more system calls similar to the socket( ), bind( ), listen( ) accept( ) and/or connect( ) system calls supported in various implementations of the Internet protocol suite's TCP protocol. In other embodiments, a connectionless protocol such as UDP may be used, which may involve the use of a different sequence of system calls. In subsequent discussion of FIG. 3 and FIG. 4, to simplify the presentation, the use of a connection-oriented protocol is assumed. When data is to be transferred from the source application 125A to some other application component located at the different instance, application data payload 335 (e.g., the data to be transferred at the application-to-application level) may be passed to instance networking stack 335A (which in turn is part of an operating system in use for instance 120A) at source host 112A. The instance networking stack 335A may, in some implementations, depending on the size of the application data payload and/or the packet size limits of the protocol in use, partition the application payload into smaller pieces such that each of the pieces can be included within a respective baseline packet 355. The application data component may form the "body" of the baseline packet, and a set of headers (such as a TCP header and an IP header, in the case where a TCP connection is being used) generated by the instance networking stack 325A may be included in the baseline packet, as also indicated in FIG. 5 below. In different implementations, headers corresponding to different combinations of layers of the protocol being used may be incorporated within the baseline packet by the instance networking stack—e.g., in one implementation in which the OSI (Open Systems Interconnect) model is used, a data link layer header may also be included in the baseline packet, in addition to a transport layer (e.g., TCP) header and a network layer (e.g., IP) header.

The baseline packet 355 may be transmitted towards the destination instance by the instance networking stack 325A over a network interface accessible from instance 120A. In at least some implementations, such a networking interface may comprise a virtual interface set up by VMSS 115A, such that the baseline packet 355 can be intercepted or received by the encapsulating/unpacking module (EUM) 345A. EUM 345A may be configured to make several types of decisions regarding the baseline packets of a given transmission in the depicted embodiment. For example, the EUM 345A may make a determination as to whether path balancing is to be attempted for the transmission, based on factors such as the client on whose behalf the data transfer is being performed, an indication of the number of alternate paths available to the destination, the approximate number of hops involved, budget limits (e.g., in embodiments in which data transfers that use path balancing are billed at a different rate than other transfers), or based on client requests or client settings. If path balancing is to be implemented, the EUM 345A may then have to determine what types of values are to be added to the baseline packets (in accordance with the path-balancing policy in use) to generate the corresponding encapsulation packets—e.g., whether UDP source or destination port numbers are to be added, whether sequence numbers are to be added so that an attempt to deliver baseline packets in order can be made at the destination, or whether other fields are to be added. For each type of field for which a value is to be added, the EUM may further be configured to determine the specific value to be added for each given baseline packet 355. For example, in one embodiment in which a UDP source port number and a sequence number is to be added, the source port number may be selected at random from a range of allowed source port numbers, and the sequence number may be determined based on either a counter maintained per transmission by the EUM, or derived from a sequence number already included in the baseline packet (e.g., a TCP sequence number). In some embodiments, the EUM may also be configured to add any additional fields (e.g., an IP header) or values that may be required to ensure that the encapsulation packet 375 reaches the correct destination host via the interconnect. In the depicted embodiment, an encapsulation packet 375 is shown with the baseline packet as its body, and a set of extra headers 372 added for path balancing and perhaps other purposes. The encapsulation packet 375 may then be transmitted to the dense multi-path interconnect in the depicted embodiment, where a routing component 351 may be configured to interpret the values added by EUM to determine at least a portion of the route (e.g., one or more interconnect links) to be used for the encapsulation packet 375. Depending on the techniques used to determine the added field values, different encapsulation packets 375 of the same transmission may have different field values, and hence different network links selected for their transmission towards the destination hosts.

Figure 4:
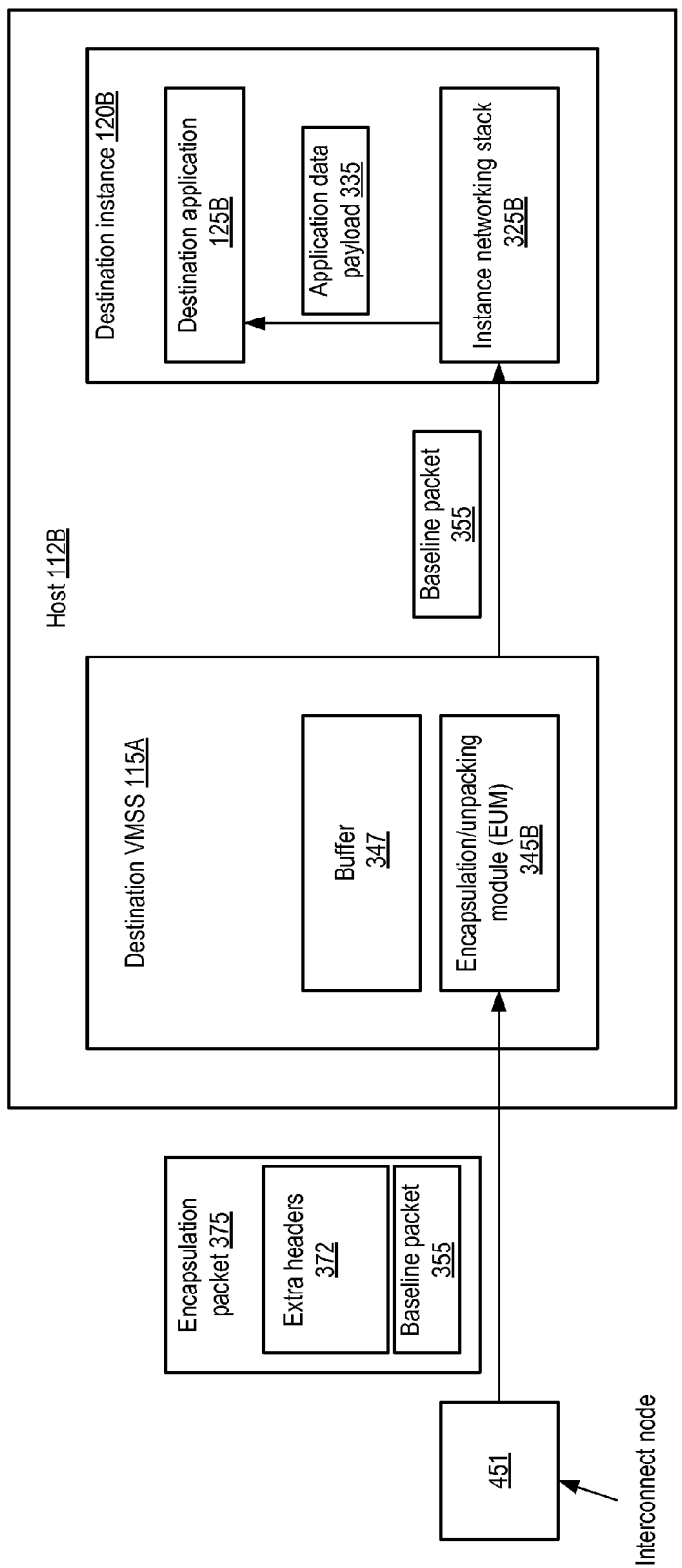
FIG. 4 illustrates examples of components at a destination of a network transmission that may participate in unpacking packets to which fields were added to distribute network traffic across multiple paths, according to at least some embodiments.
Figure 5:
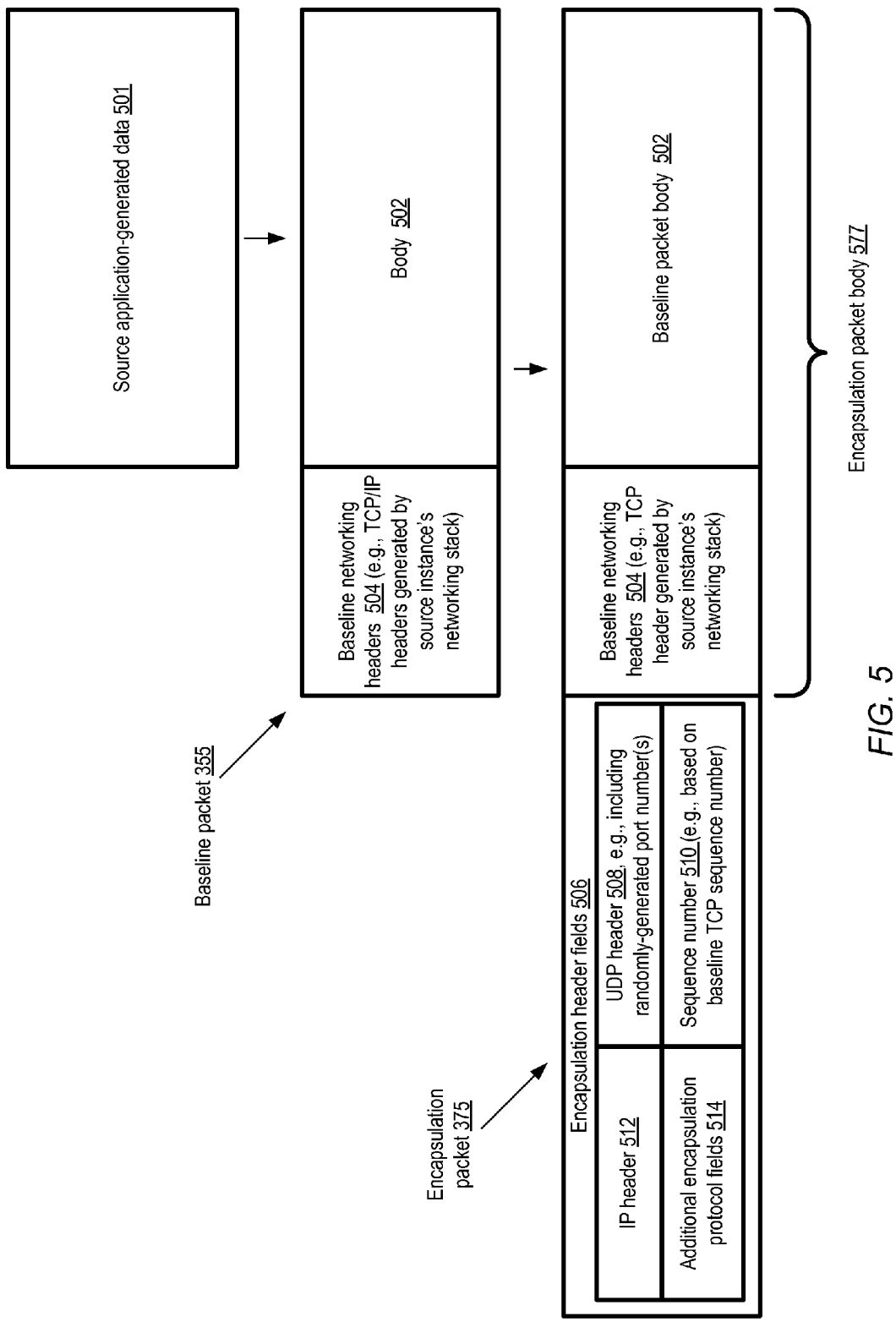
FIG. 5 illustrates example fields that may be added to a baseline packet by an encapsulation module, according to at least some embodiments.

FIG. 4 illustrates examples of components at a destination of a network transmission that may participate in unpacking encapsulation packets to which fields were added to distribute network traffic across multiple paths, according to at least some embodiments. As shown, an encapsulation packet 375 comprising a baseline packet 355 and headers 372 added by an EUM at a source VMMS may be received at an EUM 345B of a destination VMSS 115B at host 112B from an interconnect node 451. The receiving EUM 345B may be responsible for extracting the baseline packet 355 from the encapsulation packet 375, e.g., by parsing the encapsulation packet and stripping the headers 372. In some embodiments, e.g., depending on whether in-order delivery of baseline packets is required at the destination and on whether the encapsulation packets are delivered out of order to the EUM 345B, some number of the received encapsulation packets may be stored temporarily in a buffer 347 by EUM 345B. In at least one implementation, a timeout may be used to determine how long the EUM 345B buffers a given encapsulation packet received out of order, before the EUM abandons its wait for the missing packets yet to be delivered, and passes on the out-of-order baseline packet to the instance networking stack 325B at the destination instance 120B. In some implementations, the EUM 345B may not transfer a baseline packet to instance networking stack 325B unless all previous packets have been transferred in order, i.e., the EUM 345B may simply drop some packets if delivery order cannot be maintained. Sequence numbers inserted in the encapsulation packets by the source EUM (e.g., EUM 345A of FIG. 3) may be used at the destination EUM 345B to deliver baseline packets in the correct order in some embodiments. If a packet is not received in the expected order at the instance networking stack 325B, it may respond by issuing a retransmission request to in some implementations; in other implementations the source instance networking stack may determine based on a lack of an acknowledgement that a packet has been lost, and may initiate retransmission on its own. The instance networking stack 325 may assemble the application data payload 335 (e.g., by combining the contents of several different baseline packets) and provide it to the destination application 125B at destination instance 120B.

In some embodiments, the instance networking stacks at the source and destination instances may support the transmission by the applications of larger packet sizes than can be transferred in one unit by the interconnect. In such cases the EUMs at the source and destination EUMs may be configured respectively to partition the larger packets into smaller units at the sending side, and reassemble the partitions at the receiving side, using sequence numbers or other techniques similar to those described above for in-order delivery of normal-sized packets.

FIG. 5 illustrates example fields that may be added to a baseline packet by an encapsulation module, according to at least some embodiments. As described earlier with reference to FIG. 3, application-generated data 501 to be transferred to a destination may be organized into one or more "body" portions 502 of baseline packets 355. Each baseline packet may comprise, in addition to the body portion 502, a set of network protocol headers 504 for one or more layers of a networking stack being used for the transfer from the source networking stack to the destination networking stack. For example, in one embodiment, the protocol headers 504 may include one or more of a transport layer header (such as a TCP header), a network layer header (e.g., an IP header), or a link layer header.

An encapsulation intermediary such as an EUM 345 may generate values for one or more additional fields 506 to be added to a baseline packet to form a corresponding encapsulation packet. In the embodiment depicted in FIG. 5, the additional encapsulation fields 506 may include, for example, an IP header 512, a UDP header 508 that includes one or more randomly-generated port numbers or other fields that can be used for hop selection by a routing component, a sequence number (which itself may be derived at least in part from headers of the baseline packet in some embodiments, e.g., from the TCP sequence number of the baseline packet), and/or other fields 514 used for other aspects of the encapsulation protocol in use. Such additional encapsulation fields 514 may, for example, comprise client identifiers, monitoring-related information (e.g., tags that can be used to classify packets based on application type), and/or billing-related metadata. For the encapsulation packet, the body 577 may comprise the entire baseline packet (including the baseline headers 504) in the depicted embodiment. In some implementations, not all the values added by the source EUM need be header fields; i.e., some added fields may be included in portions of the encapsulation packet that may be considered part of the body rather than the headers. At the destination EUM, the baseline packet may be extracted, and the baseline body may be transferred by the instance networking stack to the destination application.

Methods for Multi-Path Utilization Enhancement Using Encapsulation

Figure 6:
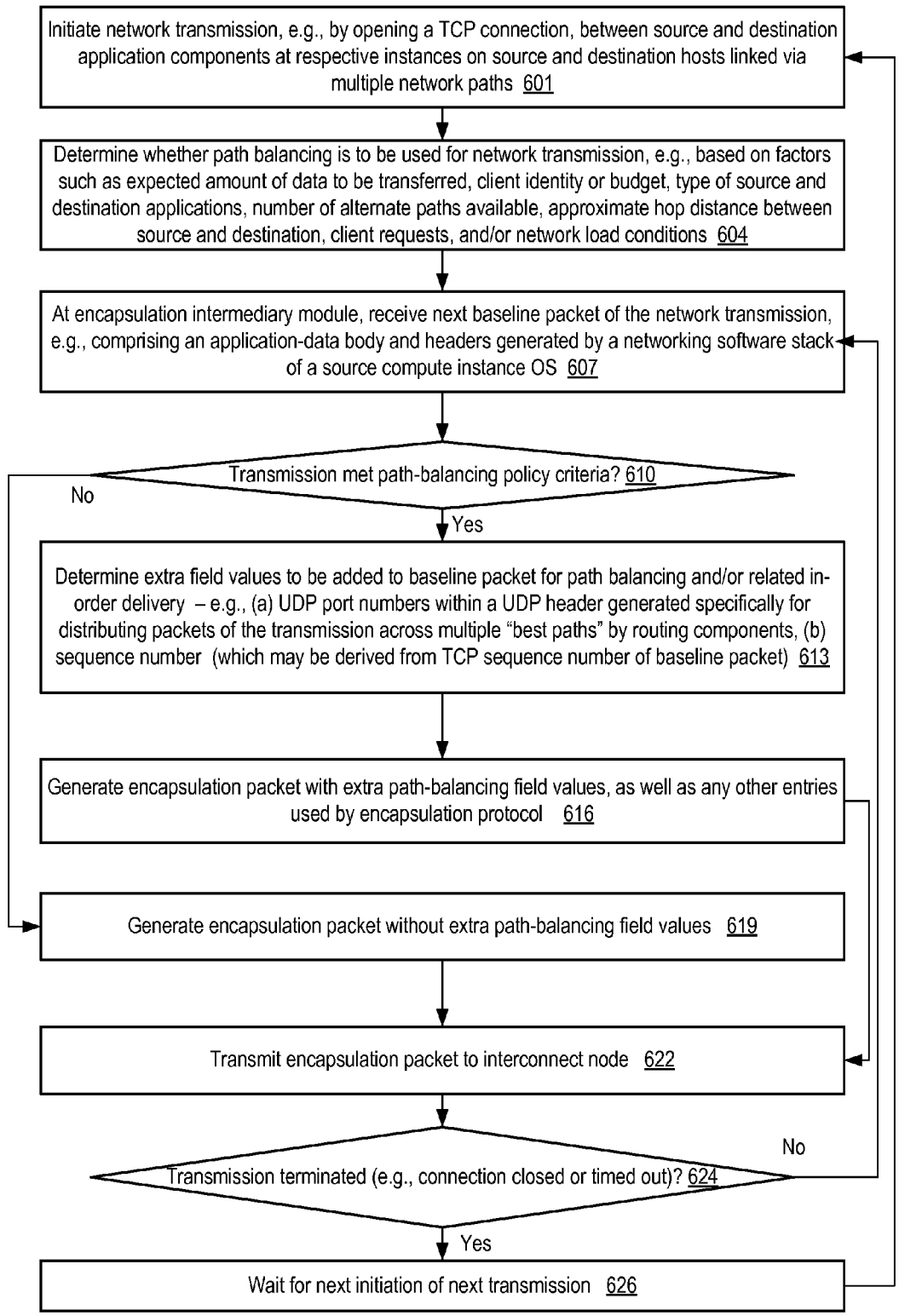
FIG. 6 is a flow diagram illustrating aspects of operations that may be performed to implement an encapsulation technique at a source host to distribute network traffic across multiple physical paths to a destination host, according to at least some embodiments.

FIG. 6 is a flow diagram illustrating aspects of operations that may be performed to implement an encapsulation technique at a source host to distribute network traffic across multiple physical paths to a destination host, according to at least some embodiments. As shown in element 601, a network transmission may be initiated, e.g., by opening a TCP connection between source and destination application components at different hosts that are linked via multiple network paths. In some embodiments, both the source and the destination hosts may be located within a provider network, e.g., at the same data center or at different data centers; in other embodiments, either the source host, the destination host, or both hosts, may be located outside the provider network. In at least one embodiment, the source and destination may be linked via a dense interconnect such as any of various types of Clos networks. Any appropriate protocol may be used for the network transmission in different implementations, including connection-oriented or connectionless protocols of various types.

Not all transmissions between the source and destination may have their traffic balanced between multiple paths. Some transmissions may be expected to be too short (i.e., the total amount of data transferred may be too small to be able to obtain significant benefits from path balancing), for example. A determination may be made as to whether path balancing is to be used for the network transmission (element 604), based on various factors in the illustrated embodiment. The factors may include, for example, any of: (a) an expected amount of data to be transferred, (b) client identity (i.e., on whose behalf the data is being transferred) or client budget limits, (c) the nature of the source and destination applications, (d) the number of alternate paths available, (e) an estimate of the number of network hops between the source and destination hosts, (f) network load conditions or (g) client requests (for example, some clients may indicate that they wish to utilize as much bandwidth in parallel as possible, even if it costs more to do so). In some embodiments, the determination as to whether path balancing is to be used may be made separately from a given transmission. For example, a determination as to whether path balancing is to be used may be made for all traffic from a given compute instance or a given host, or for a subset of traffic between a given pair of compute instances or between a given pair of hosts.

The next baseline packet of the network transmission may be received or intercepted at an encapsulation intermediary (element 607). The baseline packet may comprise a body containing application data, for example, and one or more headers generated by a networking stack included within an operating system being used for the source application. In embodiments in which the source and destination applications are executed at respective compute instances of a virtualized computing service, for example, the headers may be generated by the source instance OS.

If path balancing is to be used for the transmission (as determined in element 610), i.e., if the transmission meets the criteria for path balancing, values for one or more fields to be added to the baseline packet for path balancing purposes, and potentially for related re-ordered delivery of packets at the receiving end may be determined (element 613). Such values may include, for example, UDP source port numbers or destination port numbers, which may be selected at random from an allowable range, or may be selected using a non-random selection technique that ensures that successive packets will be assigned different port numbers with a high probability. In some embodiments, fields other than UDP port numbers may be used to implement path balancing. If in-order delivery of the baseline packets at the receiving end is desired (as would be the case if the source and destination applications had established a TCP connection) a sequence number for inclusion in the encapsulation packet may be generated by the encapsulation intermediary in some embodiments. Such a sequence number may be based, for example, on a counter maintained by the encapsulation intermediary, or may be derived from the baseline packet itself (e.g., if the baseline packet contains a TCP header with a sequence number, the new sequence number selected by the encapsulation intermediary may be based at least in part on the TCP header's sequence number).

In the depicted embodiment, encapsulation of the baseline packets may be performed for other reasons in addition to path balancing. For example, in some embodiments fields including client identifiers, monitoring-related information (e.g., tags that can be used to classify packets based on application type), and/or billing-related metadata may be added to baseline packets in accordance with a core encapsulation protocol to be used for all baseline packets regardless of whether path balancing is to be attempted or not. In some embodiments, because of flexibility granted to clients to assign network addresses of their choice to compute instances, encapsulation may have to be used to direct packets to the correct destination virtualization host (e.g., because arbitrary client-assigned addresses may not necessarily be included in the routing tables used within the interconnect). As shown in element 616, an encapsulation packet comprising the baseline packet, added path-balancing fields, and any other entries required by the encapsulation protocol(s) in use may be generated. If path-balancing is not being implemented for the network transmission (as also determined in element 610), an encapsulation packet without the path-balancing fields may be generated (element 619)). In some implementations, if path-balancing is not implemented for a given transmission, the encapsulation field or fields that could be used for path balancing (such as the UDP source port number field) may be filled with values that are not intended to result in traffic distribution across multiple paths—e.g., the same UDP port number may be added for all the packets of the transmission.

Figure 7:
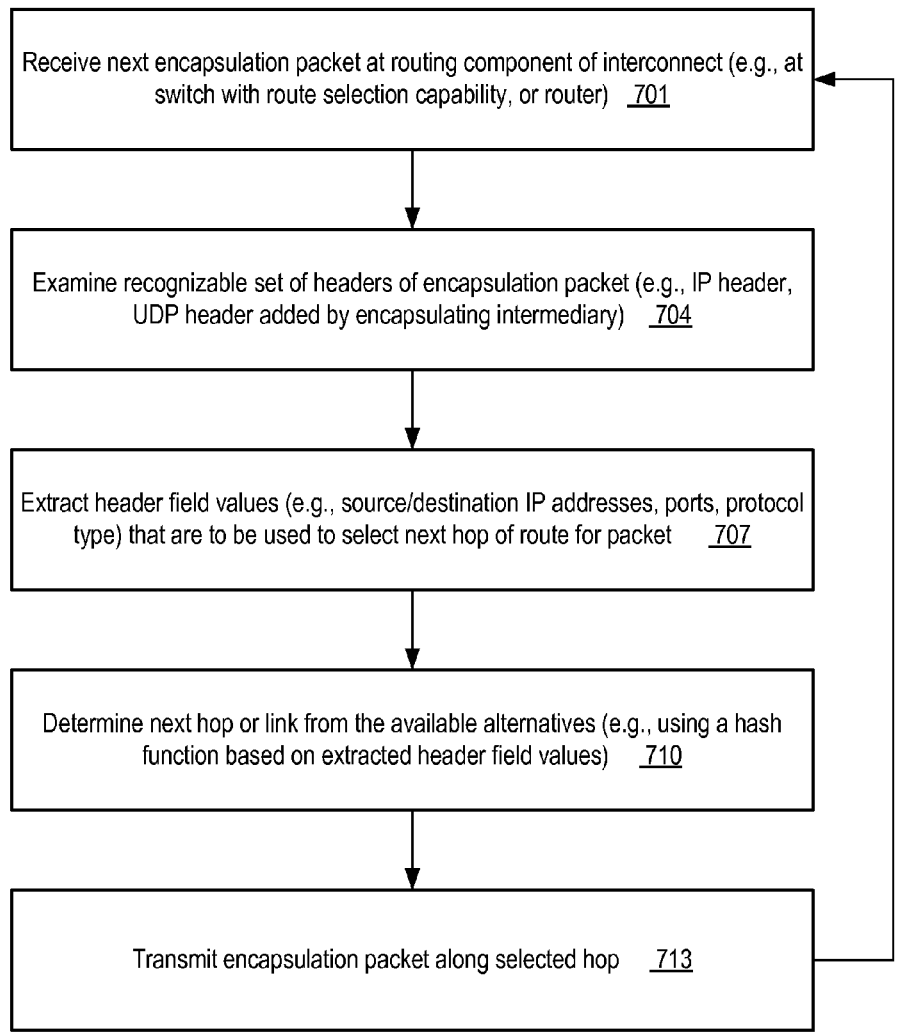
FIG. 7 is a flow diagram illustrating aspects of operations that may be performed at a routing component that receives an encapsulation packet, according to at least some embodiments.

The encapsulation packet (whether it contains fields intended to result in path balancing or not) may then be transmitted to the interconnect (element 622). Within the interconnect, routing components may parse the added fields to determine the route the encapsulation packet should take, as illustrated in FIG. 7 and described below. If the transmission comprises additional packets (as determined in the termination check of element 624), the next baseline packet may be received and encapsulated, repeating the operations corresponding to elements 607 onwards for each baseline packet. If the transmission is terminated (as detected in element 624), e.g., if the connection is closed or times out, the encapsulation intermediary may await the initiation of the next transmission (element 626), and then repeat the operations corresponding to element 601 onwards for the next transmission.

FIG. 7 is a flow diagram illustrating aspects of operations that may be performed at a routing component that receives an encapsulation packet, according to at least some embodiments. As shown in element 701, an interconnect node with routing capability (e.g., a switch, a router, or a different network component) may receive an encapsulation packet, either from the source host or from another node of the interconnect. The node may examine the contents of some set of headers of the encapsulation packet that can be used to select at least the next hop that the encapsulation packet should take. In some embodiments, the node may attempt to parse as many header fields as it can recognize (element 704). For example, it may attempt to find network-layer headers (e.g., the IP header) and transport-layer (UDP or TCP) headers in some embodiments. The node may extract the values of one or more header fields found, such as the source and destination IP addresses, the source and destination ports, and the protocol identification (element 707). The next hop may then be selected from among the available alternatives that are considered "equal-cost" alternatives, e.g., using a hash function based on the extracted values (element 710), and the encapsulation packet may be forwarded on the selected hop (element 713). Since the value of at least some of the fields used for the hop selection (e.g., the UDP port fields) may have been specifically generated by the encapsulation intermediary to induce the node to select different hops for different packets of the transmission, this would help to balance the traffic for the transmission across multiple paths emanating from the node. The same kind of traffic distribution may be expected to occur at the next interconnect node where multiple equal-cost hops are available.

Figure 8:
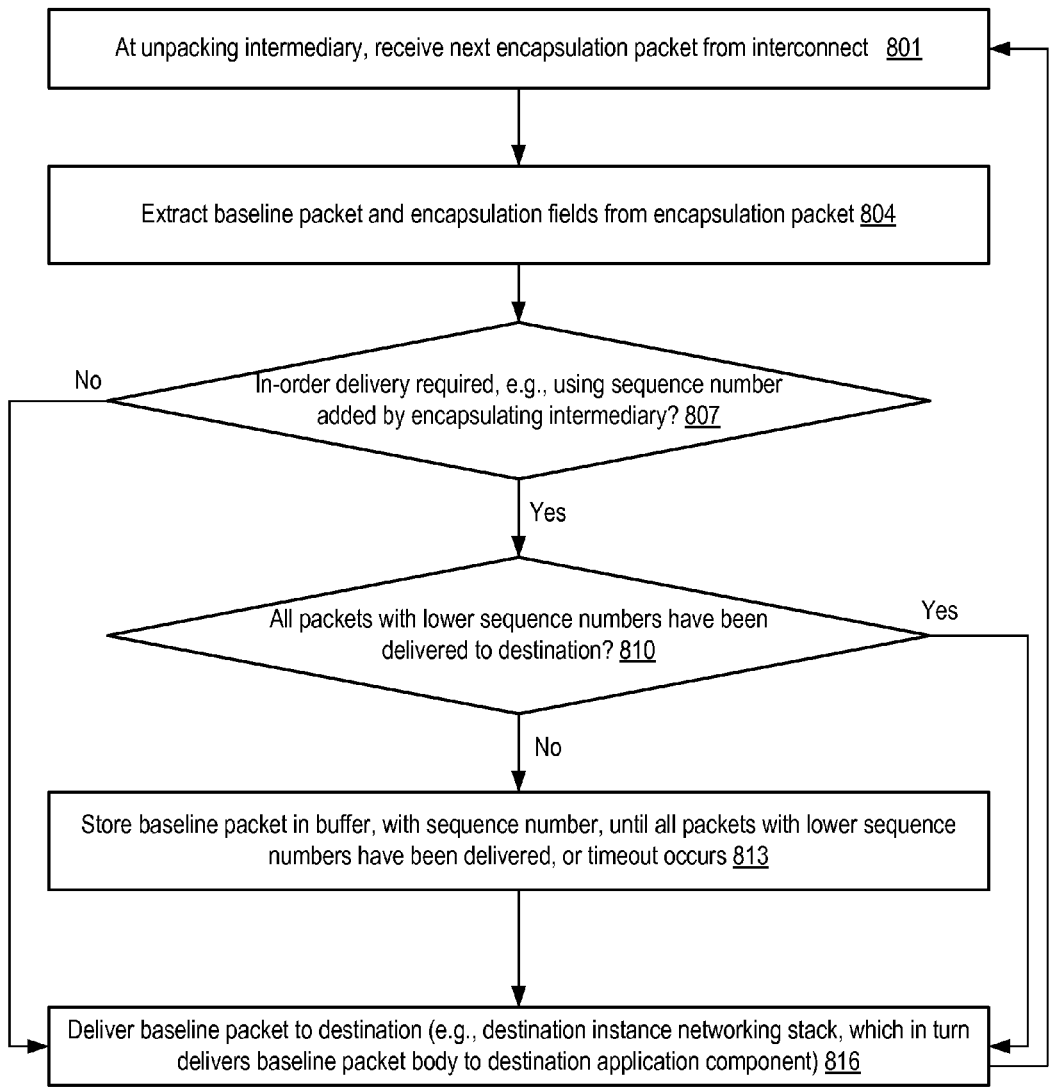
FIG. 8 is a flow diagram illustrating aspects of operations that may be performed at an unpacking intermediary that receives an encapsulation packet, according to at least some embodiments.

FIG. 8 is a flow diagram illustrating aspects of operations that may be performed at an unpacking intermediary that receives an encapsulation packet, according to at least some embodiments. As shown in element 801, the next encapsulation packet of a network transmission may be received at the unpacking intermediary. The unpacking intermediary may extract the encapsulation fields and the baseline packet from the encapsulation packet (element 804). The unpacking intermediary may determine whether in-order delivery of packets is required for the transmission (element 807), e.g., by determining whether the encapsulation fields include a legitimate sequence number, or based on information that the unpacking intermediary has obtained from other sources.

If in-order delivery is required, and all previous packets of the transmission (e.g., packets with lower sequence numbers) have already been delivered (as determined in element 810), the baseline packet may be delivered to the destination instances' networking stack (element 813). The application data stored in the body of the baseline packet may be delivered by the instance networking stack to the application layer. If in-order delivery is not required (as also determined in element 807), the baseline packet may also be delivered immediately to the destination instance networking stack (element 816).

In the depicted embodiment, if in-order delivery is required, and at least one previous packet has not yet been delivered (as also determined in element 810), the unpacking intermediary may store the received baseline packet (or the entire encapsulation packet in some implementations) temporarily in a buffer (element 813). The packet may be buffered until either (a) all the previous packets have been delivered or (b) a timeout associated with the packet occurs. In either case, in the depicted embodiment, the packet may be removed from the buffer and delivered to the destination instance networking stack. In other embodiments, if the timeout occurs, the buffered packet may be discarded instead. The destination instance networking stack may be responsible for responding appropriately to missing packets in the depicted embodiment, e.g., by sending a retransmission request or by relying on the source instance networking stack to retransmit the packet as a result of not receiving an acknowledgement within an expected acknowledgement time period. The unpacking intermediary may then wait for the next encapsulation packet, and repeat operations corresponding to elements 801 onwards.

It is noted that in various embodiments, operations other than those illustrated in the flow diagrams of FIGS. 6, 7 and 8 may be implemented to support path-balancing for network transmissions, and that some of the operations shown may not be implemented, or may be implemented in a different order or in parallel rather than sequentially.

Use Cases

The techniques described above, of using encapsulation to distribute network traffic over multiple available paths, may be useful in many types of scenarios. Some provider network operators may use large numbers of relatively inexpensive networking components, such as switches arranged in various types of Clos network topologies, to set up dense interconnects for the hosts located within their data centers.

The networking components may already be capable of equal-cost multi-path (ECMP) routing, without any additional reprogramming or reconfiguration. Encapsulation intermediary modules configured to generate artificial header values (e.g., randomly-selected UDP source/destination port numbers) to be added to packets primarily to induce path balancing at the interconnect components may be efficiently incorporated at various hosts in the data centers. For example, such intermediary modules may be included as part of the virtualization management software stacks installed at the hosts to support virtual compute instances. The virtual compute instances themselves need not be modified to benefit from path balancing technique.

In many cases, clients may not even be aware that path balancing is being implemented on their behalf. Overall, the introduction of the path balancing technique may help increase the average utilization levels of the interconnect links substantially, which may in turn have several positive results such as improved application performance (especially for networking-intensive applications), improved customer satisfaction levels, and higher returns on investment for the provider network operator's interconnect infrastructure.

Illustrative Computer System

Figure 9:
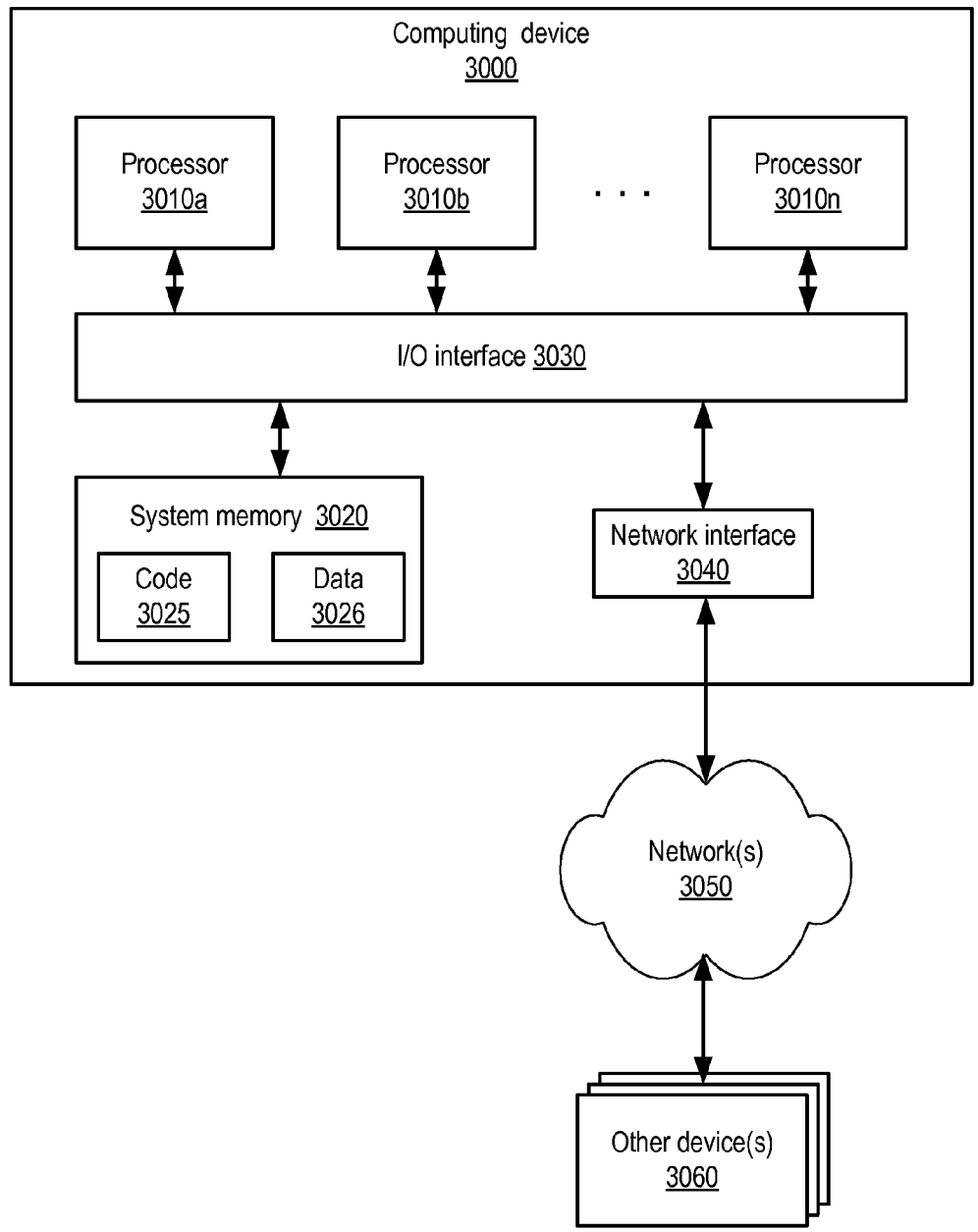
FIG. 9 is a block diagram illustrating an example computing device that may be used in at least some embodiments.

In at least some embodiments, a server that implements a portion or all of one or more of the technologies described herein, including the techniques to implement the encapsulation and/or unpacking intermediaries, the VMSSs, the interconnect nodes, and/or the virtualization hosts may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to:
receive, at an encapsulation intermediary, a plurality of baseline packets of a network transmission between a source application component executing at a particular host and a destination application component executing at a different host, wherein the different host is linked to the particular host by a plurality of physical network paths, wherein each baseline packet of the plurality of baseline packets comprises a respective body component and a respective set of network protocol headers generated at the particular host;
determine whether to implement path balancing for the network transmission based at least in part on at least one of an expected amount of data to be transferred, or an indication of a number of physical network paths linking the particular host and the different host; and
responsive to a determination to implement path balancing:
determine, by the encapsulation intermediary comprising a particular software module executing at the particular host, in accordance with a path-balancing policy, (a) a particular header field value to be included in a particular encapsulation packet corresponding to a particular baseline packet of the plurality of baseline packets, and (b) a different header field value to be included in a different encapsulation packet corresponding to a different baseline packet of the plurality of baseline packets;
transmit the particular and different encapsulation packets to an unpacking intermediary associated with the destination application component via respective physical network paths of the plurality of physical network paths, wherein a particular physical network path used for the particular encapsulation packet comprises a particular link selected based at least in part on the particular header field value, and wherein a different physical network path used for the different encapsulation packet comprises a different link selected based at least in part on the different header field value;
extract, from the particular encapsulation packet and the different encapsulation packet respectively, at the unpacking intermediary, contents of the particular baseline packet and the different baseline packet; and
deliver respective body components of the particular baseline packet and the different baseline packet to the destination application component.

2. The system as recited in claim 1, wherein the particular header field value comprises a particular value for a source port number associated with a particular networking protocol, and the different header field value comprises a different value for the source port number associated with the particular networking protocol.

3. The system as recited in claim 1, wherein the particular encapsulation packet comprises a particular sequence number added by the encapsulation intermediary, wherein the different encapsulation packet comprises a different sequence number added by the encapsulation intermediary, and wherein the unpacking intermediary is configured to utilize the particular and different sequence numbers to determine an order in which the particular baseline packet and the different baseline packet are delivered to a networking stack associated with the destination application component.

4. The system as recited in claim 1, wherein the encapsulation intermediary is instantiated at the first host and the unpacking intermediary comprises a different software module instantiated at the different host.

5. The system as recited in claim 1, wherein the plurality of computing devices are further configured to:
determine, in accordance with the path balancing policy, that path balancing is to be implemented for the network transmission further based at least in part on one or more of: (a) an identification of a particular client on whose behalf the source application component is executed, (b) a budget limit associated with the network transmission, or (c) a client request initiated by the particular client.

6. A method, comprising:
responsive to a client request to implement path balancing, performing, by a plurality of computing devices:
generating a particular encapsulation packet corresponding to a particular baseline packet of a network transmission between a source and a destination linked by a plurality of physical network paths, wherein the client request to implement path balancing is received from a client on whose behalf the source is operated, wherein the particular encapsulation packet comprises, in addition to at least a portion of contents of the particular baseline packet, a particular set of one or more values determined in accordance with a path-balancing policy;
generating a different encapsulation packet corresponding to a different baseline packet of the network transmission, wherein the different encapsulation packet comprises, in addition to at least a portion of contents of the different baseline packet, a different set of one or more values determined in accordance with the path-balancing policy;
transmitting the particular encapsulation packet via a particular network path of the plurality of physical network paths, comprising a particular link selected based at least in part on the particular set of one or more values;
transmitting the different encapsulation packet via a different network path of the plurality of physical network paths, comprising a different link selected based at least in part on the different set of one or more values;

extracting the contents of the particular baseline packet and the different baseline packet from the particular encapsulation packet and the different encapsulation packet respectively; and delivering the particular baseline packet and the different baseline packet to the destination.

7. The method as recited in claim 6, wherein the particular set of one or more values comprises a particular source port number associated with a particular networking protocol, and the different set of one or more values comprises a different source port number associated with the particular networking protocol.

8. The method as recited in claim 6, wherein the particular set of one or more values comprises a particular value obtained via random selection, and the different set of one or more values comprises a different value obtained via random selection.

9. The method as recited in claim 6, wherein the particular set of one or more values comprises a particular value for a UDP (User Datagram Protocol) header field, and the different set of one or more values comprises a different value for the UDP header field.

10. The method as recited in claim 6, further comprising performing, by the plurality of computing devices:

including a particular sequence number within the particular encapsulation packet, and a different sequence number within the different encapsulation packet; and determining an order in which the particular baseline packet and the different baseline packet are to be delivered to the destination based at least in part on the particular and different sequence numbers.

11. The method as recited in claim 10, further comprising:

determining the particular sequence number based at least in part on a header field value of the particular baseline packet.

12. The method as recited in claim 6, wherein the source comprises an application component executing at a particular host, wherein said generating the particular encapsulation packet is performed at the particular host.

13. The method as recited in claim 12, wherein said generating the particular encapsulation packet is performed at a component of a virtualization management software stack associated with the particular host.

14. The method as recited in claim 6, further comprising performing, by the plurality of computing devices:

determining, in accordance with the path balancing policy, that path balancing is to be implemented for the network transmission further based at least in part on one or more of: (a) an identification of a particular client on whose behalf the source application component is executed, (b) an indication of a number of physical network paths linking the particular host and the different host, (c) a budget limit associated with the network transmission, or (d) an expected amount of data to be transferred.

15. The method as recited in claim 6, further comprising performing, by the plurality of computing devices:

partitioning, by an encapsulation intermediary associated with the source, contents of a particular baseline packet among a plurality of encapsulation packets; and recombining, by an unpacking intermediary associated with the destination, contents of the plurality of encapsulation packets for delivery to the destination.

16. A non-transitory computer-accessible storage medium storing program instructions that when executed on one or more processors:

determine whether to implement path balancing based at least on a number of physical network paths linking a source host and a destination host, and responsive to a determination to implement path balancing:

generate a particular encapsulation packet corresponding to a particular baseline packet directed from the source host to the destination host, wherein the particular encapsulation packet comprises, in addition to at least a portion of contents of the particular baseline packet, a particular set of one or more values determined in accordance with a path-balancing policy;

generate a different encapsulation packet corresponding to a different baseline packet directed from the source host to the destination host, wherein the different encapsulation packet comprises, in addition to at least a portion of contents of the different baseline packet, a different set of one or more values determined in accordance with the path-balancing policy; and transfer the particular encapsulation packet and the different encapsulation packet to a routing component configured to identify, for transmission to the destination host of the particular encapsulation packet and the different encapsulation packet respectively, a particular network path of the plurality of physical network paths, and a different network path of the plurality of physical network paths, wherein the particular network path is selected based at least in part on the particular set of one or more values, and wherein the different network path is selected based at least in part on the different set of one or more values.

17. The non-transitory computer-accessible storage medium as recited in claim 16, wherein the particular set of one or more values comprises a particular source port number associated with a particular networking protocol, and the different set of one or more values comprises a different source port number associated with the particular networking protocol.

18. The non-transitory computer-accessible storage medium as recited in claim 16, wherein the instructions that when executed on one or more processors:

include a particular sequence number within the particular encapsulation packet, and a different sequence number within the different encapsulation packet, indicative of an order in which the particular baseline packet and the different baseline packet are to be delivered to a target networking stack.

19. The non-transitory computer-accessible storage medium as recited in claim 16, wherein the instructions when executed on one or more processors:

receive another encapsulation packet;

extract another baseline packet from the received encapsulation packet; and deliver the other baseline packet to a target networking stack.

20. The non-transitory computer-accessible storage medium as recited in claim 16, wherein the plurality of physical network paths are arranged in one of: a fat tree topology, a VL2 (Virtual Layer 2) topology, a BCube topology, or a different Clos topology.

* * * * *